US012752444B2

(12) United States Patent
Jafari et al.

(10) Patent No.: US 12,752,444 B2
(45) Date of Patent: Oct. 6, 2026

(54) THERMAL-BASED VARIABLE IMPEDANCE ACTUATOR

(71) Applicant: UNIVERSITY OF NORTH TEXAS, Dallas, TX (US)

(72) Inventors: Amir Jafari, Dallas, TX (US); Trevor W. Exley, Dallas, TX (US)

(73) Assignee: University of North Texas, Dallas, TX (US)

( * ) Notice: Subject to any disclaimer, the term of this patent is extended or adjusted under 35 U.S.C. 154(b) by 266 days.

(21) Appl. No.: 18/418,008

(22) Filed: Jan. 19, 2024

(65) Prior Publication Data

US 2024/0342933 A1 Oct. 17, 2024

Related U.S. Application Data

(60) Provisional application No. 63/480,645, filed on Jan. 19, 2023.

(51) Int. Cl.
*B25J 19/06* (2006.01)
*B25J 17/02* (2006.01)

(52) U.S. Cl.
CPC ......... *B25J 19/068* (2013.01); *B25J 17/0208* (2013.01)

(58) Field of Classification Search
CPC ............................ B25J 19/068; B25J 17/0208
USPC .......................................................... 700/261
See application file for complete search history.

(56) References Cited

U.S. PATENT DOCUMENTS

| | | | | |
|---|---|---|---|---|
| 11,953,061 B2 * | 4/2024 | Cohen | B25J 15/0233 | |
| 2008/0115605 A1 * | 5/2008 | Erikson | F16H 25/2006 | 74/89.42 |
| 2012/0222547 A1 * | 9/2012 | Nesbitt | F15B 15/02 | 92/130 R |
| 2012/0306603 A1 * | 12/2012 | Olsson | G06F 3/016 | 335/229 |
| 2013/0178297 A1 * | 7/2013 | Pane | B25J 17/0241 | 464/51 |
| 2016/0107298 A1 * | 4/2016 | Gaw | F16B 39/02 | 81/10 |
| 2019/0352967 A1 * | 11/2019 | Shu | F01D 17/16 | |
| 2020/0139538 A1 * | 5/2020 | Jafari | B25J 9/106 | |

* cited by examiner

*Primary Examiner* — Kira Nguyen
(74) *Attorney, Agent, or Firm* — Andrew M. Metrailer; Conley Rose, P.C.

(57) ABSTRACT

An actuator includes an output link; an input member, wherein the output link and the input member are rotatable about an axis of rotation; an elastic member disposed between the output link and the input member and configured to allow transmission of torque between the output link and the input member about the axis of rotation, and to allow at the same time, as a result of elastic deformation of the elastic member, a relative rotation between the output link and input member about the axis of rotation; and a thermo-active module comprising one or more thermoplastic inserts, wherein the thermoplastic inserts are configured to apply a variable resistance between the output link and the input member and provide an adjustable damping between the output link and the input member.

20 Claims, 8 Drawing Sheets

THERMAL-BASED VARIABLE IMPEDANCE ACTUATOR

CROSS-REFERENCE TO RELATED APPLICATIONS

This application claims the benefit of U.S. Provisional Application No. 63/480,645, filed on Jan. 19, 2023, and entitled “THERMAL-BASED VARIABLE IMPEDANCE ACTUATOR,” which is incorporated herein by reference in its entirety for all purposes.

STATEMENT REGARDING FEDERALLY SPONSORED RESEARCH OR DEVELOPMENT

This invention was made with government support under contract nos. 2213263 and 2045177 awarded by The National Science Foundation. The government has certain rights in the invention.

BACKGROUND

In physical human-robot interaction (PHRI) applications, and when physically dealing with unknown environments, robotic platforms tuning their level of impedance are typically desired. Impedance is defined as resistance to motion, which has three components: stiffness, damping and inertia. Variable impedance actuators (VIAs) are a drive train generation for robotic platforms designed to physically interact with humans. These types of actuators have the capability of adjusting their impedance (e.g. through changing stiffness, damping ratio, or sometimes even the inertia), while in contact with unknown environments. This is to safeguard humans with whom the robot is interacting with as well as enhancing their performance criteria.

Variable stiffness actuators (VSAs) are the main subset of VIAs, where only the stiffness component of the output link's impedance is being regulated during the physical interaction with external environments. A variable damper and variable inertia actuators are the other two subsets of VIAs that have gained less attraction among robotics research. This is mostly due to missing energy saving and releasing components in these designs compared to the VSAs, and thus, these actuators have less potential in minimizing energy consumption in periodic motions. However, in applications where the overall system energy is suppressed below a threshold to guarantee stability, such as knee joints in bipedal robots, the addition of damping is provided to ensure energy can be released.

Typically, VIAs control at least two degrees of freedom, (e.g. link's trajectory and link's impedance) and require at least two independent sources of generating mechanical power (e.g. flow and effort), such as electric motors. If both damping and stiffness are controlled on top of the link trajectory, then three motors are usually utilized.

Changing the parameters of the impedance is typically done by a dedicated mechanism embedded inside the actuator. However, adding these mechanisms into the actuators' designs results in bulky, heavy, and large actuators as compared to traditional rigid or series elastic actuators (SEA). This bulkiness is a practical drawback of VIAs that has dramatically limited their suitability in many applications. The added components increase the inertia (one of the impedance's component) which reduces safety criterion of the actuator for PHRI applications. Consequently and most frequently, having a SEA is preferred over a VIA, even in applications which require impedance adjustments, such as bipedal locomotion and manipulation. Thus, there is a need for an improved actuator.

BRIEF DESCRIPTION OF DRAWINGS

For a detailed description of the aspects of the disclosed processes and systems, reference will now be made to the accompanying drawings in which.

DETAILED DESCRIPTION

In some embodiments, variable Impedance Actuators (VIAs) are a new generation of robotic drive trains that are suitable for physical human-robot interactions. These actuators can adjust their level of impedance to safely and efficiently interact with unknown environments. In this disclosure, a one-of-a-kind thermal-based variable impedance actuator is disclosed. Unlike other actuators that employ a mechanism to regulate their impedance, this actuator controls a temperature of a thermoplastic polymer, such as polycaprolactone. The viscoelastic properties of polycaprolactone are temperature dependent, increasing rigidity when cooled and softening when heated. In order to change the temperature, thermoelectric Peltiers can be embedded into the actuator. While the rate of impedance adjustment may be not fast enough for dynamic impedance adjustment, the simplicity and lightness of the proposed design can be suitable for off-line impedance adjustment applications where the actuator's size, weight, and compactness are the main concerns. In some embodiments, the actuator is highly scalable, and by scaling down the size of the actuator, the performance of the actuator regarding the speed of impedance adjustment can be increased upon scaling up.

The thermoplastic polymer can comprise any suitable polymer that can change stiffness at or near the operating conditions of the actuator. In some aspects, the thermoplastic polymer can comprise polycaprolactone (PCL). The PCL belongs to a class of polymers known as thermoplastics, which change their viscoelasticity as the temperature moves from cold (rigid) to hot (soft).

Figure 8:
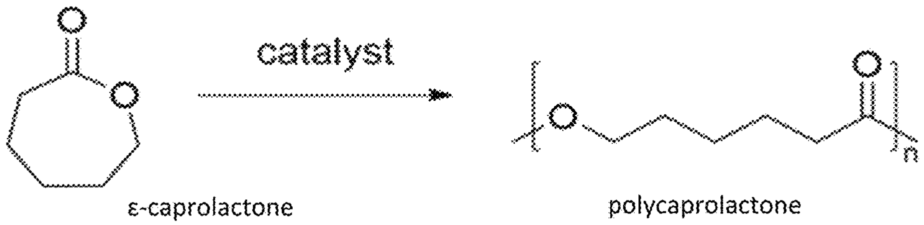
FIG. 8 is a schematic depiction of a ring opening polymerization reaction of ε-caprolactone in the present of catalyst converting to a structure of polycaprolactone having a repeating unit of the ε-caprolactone monomer.

Polycaprolactone is a biodegradable polyester with a low melting point of around 60° C. and a glass transition temperature of about 60° C. In some embodiments, polycaprolactone can be prepared by ring opening polymerization of ε-caprolactone using a catalyst such as stannous octoate $Sn(Oct_2)$. In polymer chemistry, the ring-opening polymerization is a form of chain-growth polymerization, in which the terminus of a polymer chain attacks cyclic monomers to form a longer polymer. Ring-opening polymerization is a versatile method for the synthesis of biopolymers. The structure of PCL is shown in FIG. 8. Usually, this chain results from ring-opening polymerization in PCL to form a thermoplastic polymer.

Figure 9:
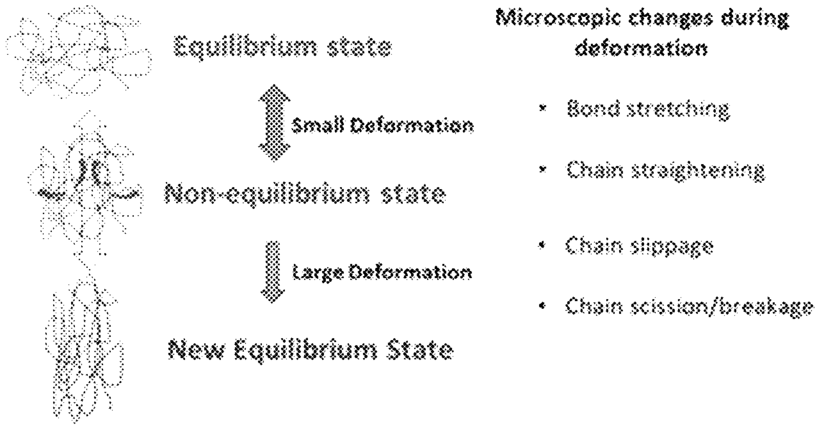
FIG. 9 is a schematic depiction of recoverable and permanent deformations of a polymer due to the external forces.

Referring to FIG. 9, as a polymer, polycaprolactone exhibits viscoelastic behaviors when undergoing recoverable and permanent deformations depending on the levels of applied forces. Polymeric chains can have motions at different timescales from atomic vibrations to full chain diffusion. Diffusion of large segments of chains occurs at a much slower speed than diffusion of small segments. Due to this property, polymeric materials have time-dependent deformations.

In the absence of an external force, the morphology of the polymer chain is determined by the internal forces, such as: chemical bond, intermolecular interactions, segmental mobility, entanglements, and crystals. At this morphology, the internal forces continuously interact with each other to form the lowest possible state. This state is a highly disordered form of chains called the equilibrium state. When an external force is applied, the external force can lead to the alignment of some polymer chains in the force direction. However, other polymer chains can pull the affected chains back to the original position through the entanglement points. At small deformations, bond and chain strengthening can take place. Both deformations act like strengthening of a spring, so the polymer can return to its original shape once the force is removed, as depicted in FIG. 8. On the other hand, if the polymer chain is deformed further or the load is applied for long time, then chain breakage and slippage can occur. Although not wanting to be bound by theory, both phenomena can result in a permanent change in the polymer morphology. As a result, when the force is removed, the chain is unable to return to its original shape and can retain a new equilibrium state, as depicted in FIG. 9.

Furthermore, polycaprolactone is a plastic polymer material that becomes pliable or moldable at a certain elevated temperature and solidifies upon cooling. Many thermoplastics have a high molecular weight. The polymer chains associate by intermolecular forces, which rapidly weaken with increased temperatures, yield a viscous liquid. In this state, thermoplastics may be reshaped and are typically used to produce parts by various polymer processing techniques. As a result, PCL changes its degree of stiffness as temperatures move from cold (rigid) to hot (soft).

Figures 10A, 10B, 10C:
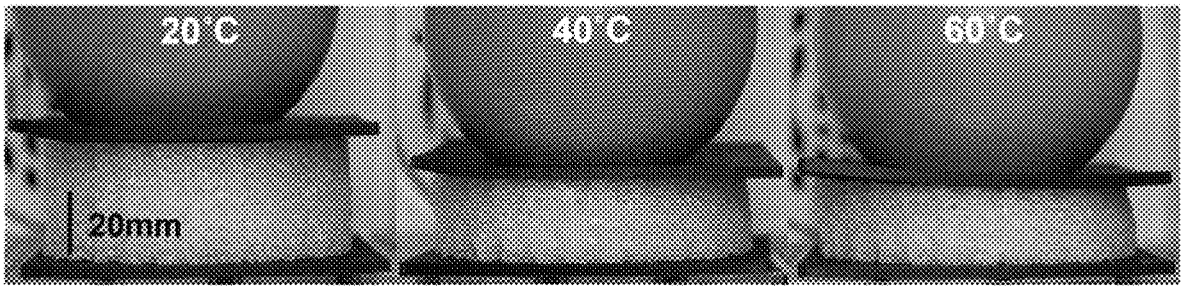
FIGS. 10A-C are photographic depictions of compression of a polycaprolactone sponge with 4.5 kilogram (kg) of added weight at 20 degrees Celsius (° C.), 40° C., and 60° C.
Figure 11:
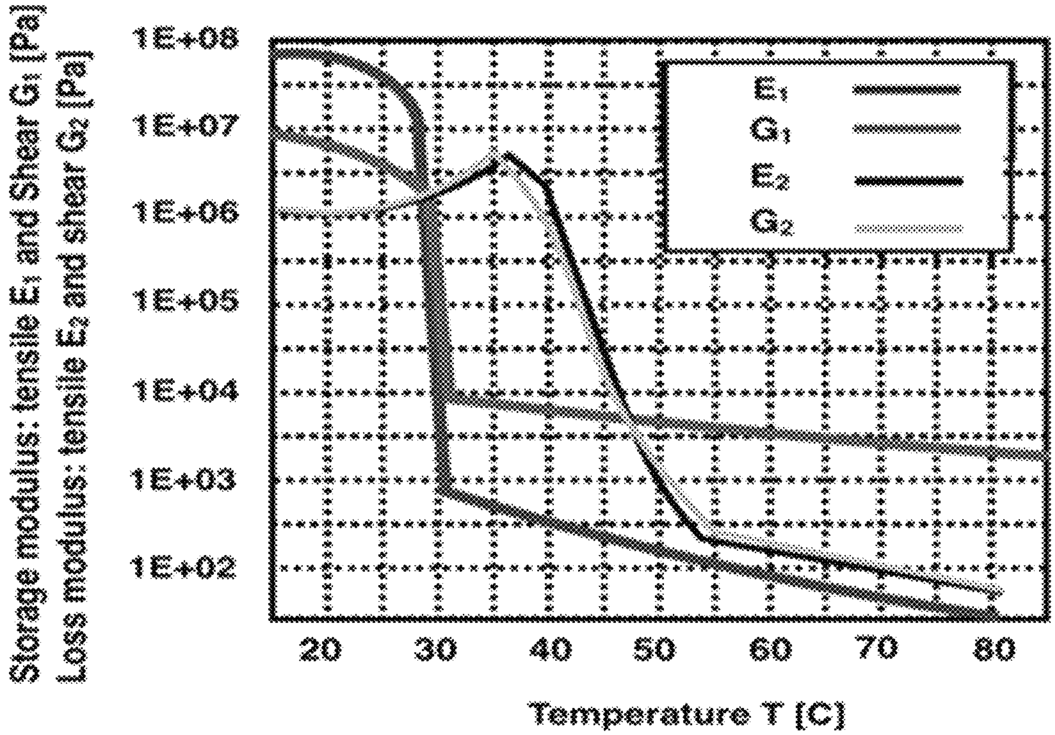
FIG. 11 is a graphical depiction of storage and loss (tensile and shear) moduli of polycaprolactone at different temperatures.

In some embodiments, to determine the impedance variation of polycaprolactone as a function of temperature, some static tests are conducted (e.g., evaluating stiffness component of the impedance) on a sponge made of polycaprolactone. In these experiments (as shown in FIGS. 10A-C), a known weight (2.7 kilogram (kg)) is placed on the sponge while the temperature changes from about 10° C. to about 60° C. The vertical deflection of the sponge is then measured and then normalized with its original thickness to determine the strain. Similarly, the weight is divided by the area of the sponge to calculate the stress. In order to better understand the impedance properties, the viscosity and the elasticity of polycaprolactone, e.g., its storage $E_1$, $G_1$ and loss $E_2$, $G_2$ moduli (tensile and shear), as functions of temperature T have to be taken into account. As shown in FIG. 11, both tensile moduli have a sudden drop when the temperature exceeds about 30° C. Below this threshold temperature, $E_2$ less than or equal to $E_1$ and $G_2$ less than or equal to $G_1$ imply that the elastic behavior of the material is more dominant that its viscous property. When the temperature is higher than about 45° C., polycaprolactone becomes very soft and will be a more viscous material rather than an elastic as $G_1$ less than or equal to $G_2$.

In some embodiments, compression springs positioned around a wheel can be fashioned as springs in parallel to polycaprolactone, which can model as a combination of a spring and a dashpot. In some aspects, there are two main methods to model a viscoelastic material such as polycaprolactone, namely; Maxwell, or Kelvin-Voigt models. Both models can use springs to depict a pure elastic element and a dashpot to represent a pure viscous element.

In the Maxwell model, both the spring and the dashpot are subject to the same stress, but each element has an independent strain. In the Kelvin-Voigt model, both the spring and the dashpot are subjected to the same strain but each element has independent stress. The Maxwell model can predict the recovery phase (after releasing the external load) more precisely than the Kelvin-Voigt model. However, the Kelvin-Voigt model can more accurately represent the strain rate-time dependency which is fundamental in viscoelastic behavior, e.g., the creep phenomenon. In modeling a viscoelastic material with pre-dominant elasticity, the Kelvin-Voigt model is usually applied to describe the creep behavior of the material due to its practicality and wide application.

Figure 12:
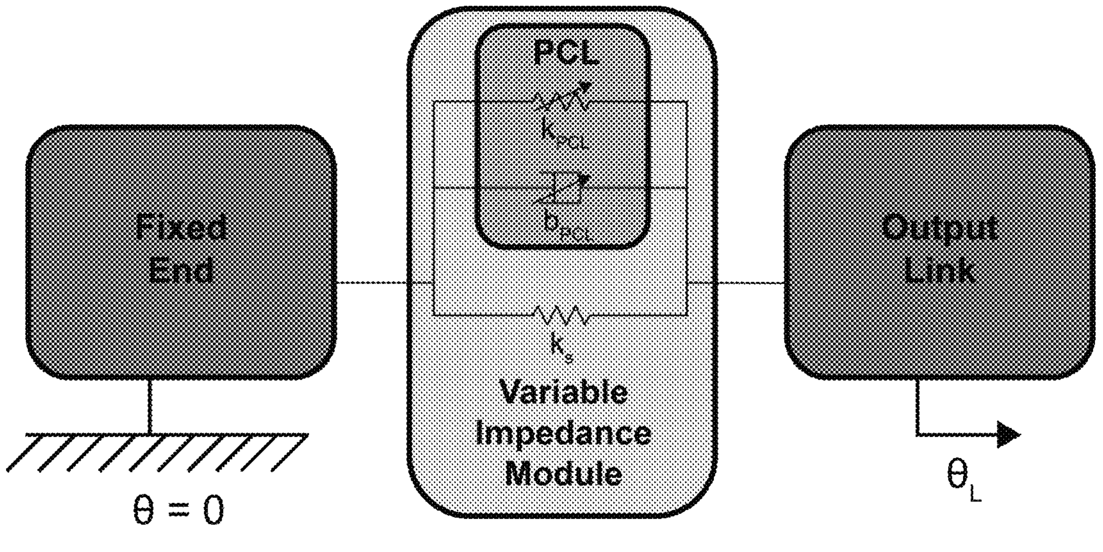
FIG. 12 is a schematic depiction of a proposed variable impedance module, located in series between the fixed end and the output link and powered through Peltiers.

In some embodiments, the polycaprolactone can serve as a Kelvin-Voigt model, because the compression springs will be modeled as a spring in parallel with polycaprolactone, which can have higher stiffness than that of the spring in the polycaprolactone VIA model, as depicted in FIG. 12.

Referring to FIG. 12, the output link is attached to the variable impedance unit fixed to the base. The variable impedance unit is composed of a damper to represent viscosity of polycaprolactone $b_{P\ CL}$, a spring to represent elasticity of polycaprolactone $k_{P\ CL}$, and a spring for the compression springs with constant stiffness $K_s$. The output link's position is represented by $\theta_L$, while the position of the fixed end is zero. Similarly the torque of the fixed end is assumed to be zero and $T_L$ is the output torque available at the output link of the actuator. The Peltier generates or absorbs heat to adjust the temperature of the side in contact with the polycaprolactone. Changing the temperature alters the tensile and shear storage and loss moduli of polycaprolactone, e.g., $E_1$, $G_1$, $E_2$, and $G_2$ respectively, and consequently its elasticity and viscosity, e.g., $k_{P\ CL}$ and $b_{P\ CL}$ respectively. The equation of motion for the output link as a result of the output torque is as follows:

$$b_{PCL}\theta_l + (k_{PCL} + k_s)\theta_l = I_l\ddot{\theta_l} + T_l \tag{1}$$

where $I_L$ is the link's inertia.

In terms of Stress-Strain, the Kelvin-Voigt model leads to the following equation:

$$\sigma(t) = \frac{d\epsilon(t)}{E_1\epsilon(t) + \eta(G_2)dt} \tag{2}$$

where η is the viscosity of polycaprolactone which is related to the loss modulus as: $\eta = G_2/\omega$, where ω is the frequency of the load.

behaves compliant. One or more position sensors (e.g., encoders, etc.) can be used to track the relative positions of the output link and the motor input. Therefore, having the springs between the output link and the end can make the embodiment act similar to a series elastic actuator (SEA). However, the overall impedance changes from adjusting the temperature inside the housing to utilize the viscoelastic properties of polycaprolactone. In essence, the compression springs can be seen as a constant stiffness, attached in parallel with an adjustable stiffness and damping mechanism of the polycaprolactone.

Figure 2:
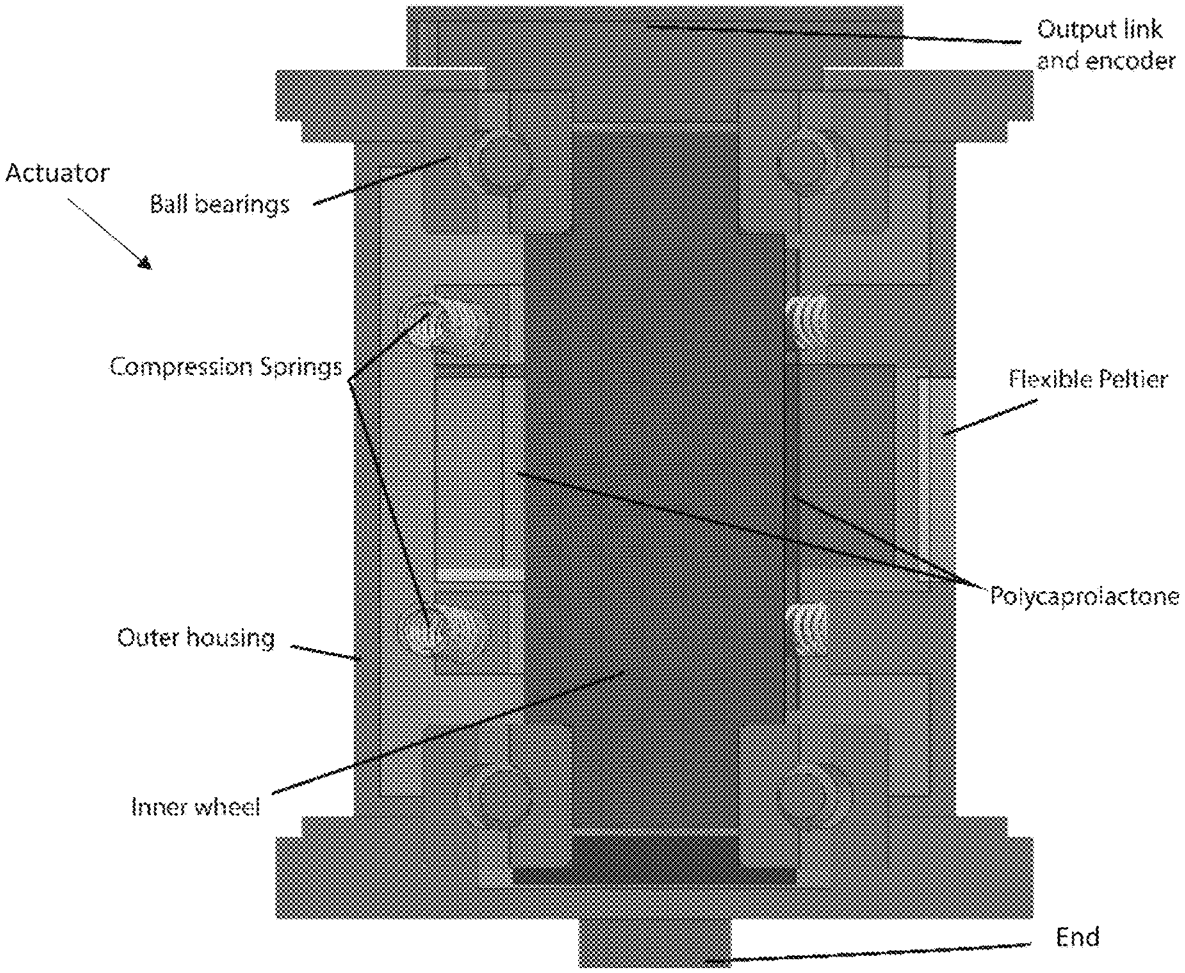
FIG. 2 illustrates a cross sectional view of a variable impedance actuator according to some embodiments.

All housing components, the output link, and fixed base of the VIA prototype depicted in FIG. 2 can be 3D printed. Polyethylene terephthalate glycol (PETG) is chosen for the filament as it has better shock resistance than traditional PLA and can withstand the higher range of temperatures from the Peltier modules without melting or warping.

In some embodiments, the VIA contains a fixed end attached in series with a thermo-active variable impedance

TABLE I

| System Parameters | | |
|---|---|---|
| Parameter | Value | |
| Individual spring stiffness $k_s$ | 266.88 | newton/meter (N/m) |
| Total spring stiffness $K_S$ | 1.6343 | newton-meter/radian (Nm/rad) |
| Distance of springs from center axis | 22.57 | millimeter (mm) |
| Length of output link $L_l$ | 140 | mm |
| Moment of inertia of output link L | $2.999 \times 10^{-5}$ | $kg \cdot m^2$ |
| Weight | 0.58 | kg |
| Maximum angular deflection | 1.0472 | rad |
| Amount of polycaprolactone in each cavity | 1.05 | gram (g) |
| Volume of Polycaprolactone in each cavity | 11,200 | $mm^2$ |

While described in terms of using PCL in some embodiments, any suitable polymer that can change stiffness within the operating temperature range of the Peltier can be used.

Figure 1:
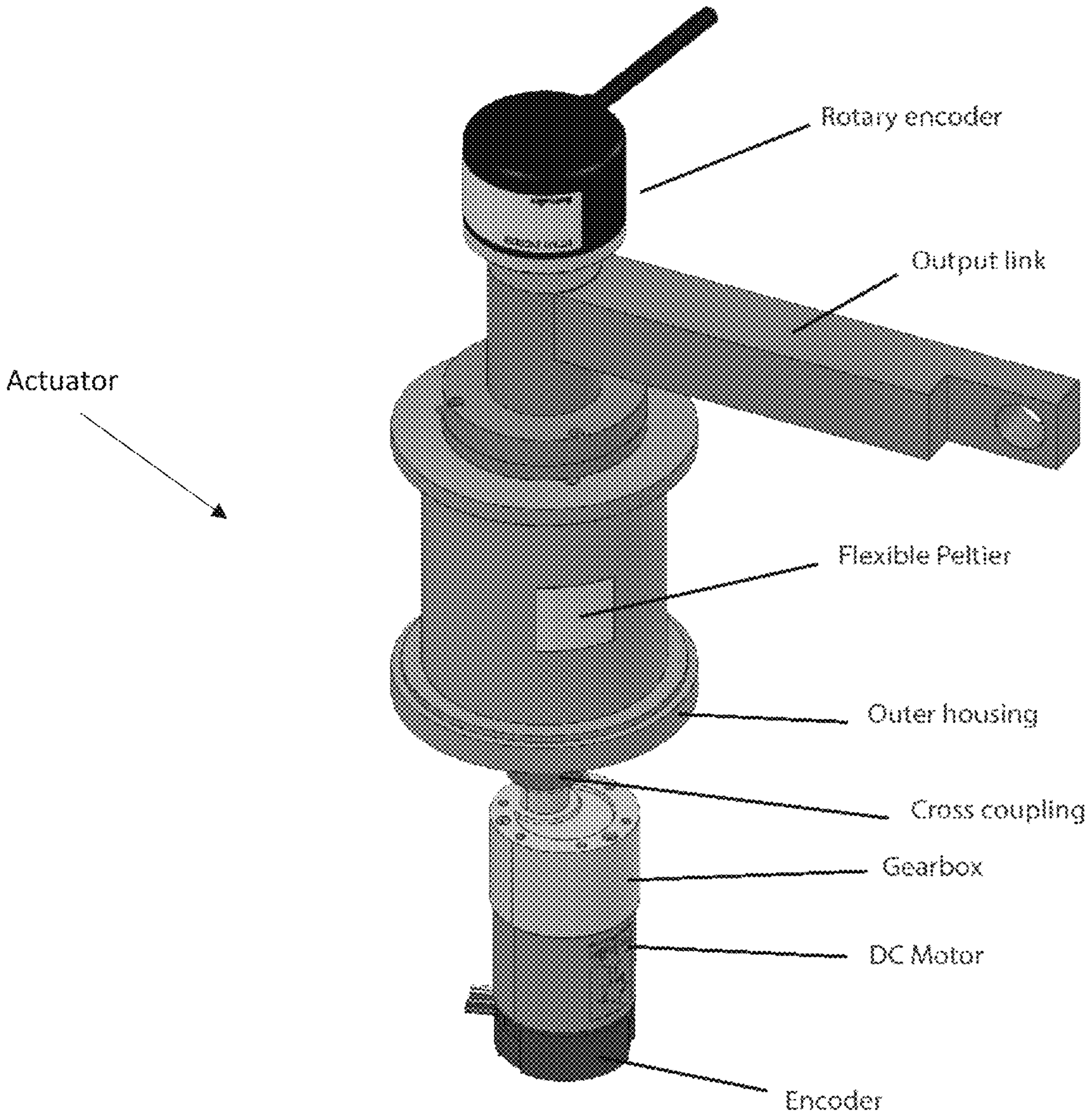
FIG. 1 illustrates an isometric view of a variable impedance actuator according to some embodiments.
Figure 3:
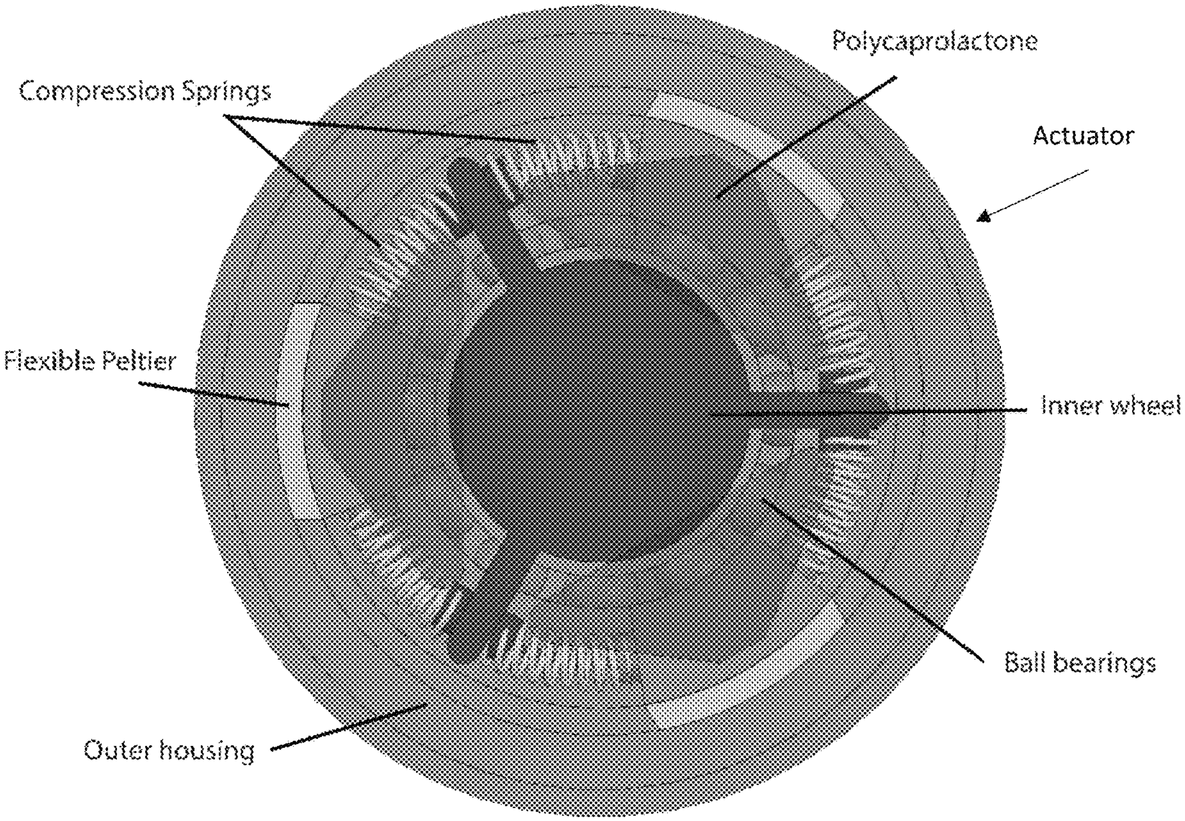
FIG. 3 illustrates a top view of a variable impedance actuator according to some embodiments.

Referring to FIGS. 1-3, a thermo-active module can be coupled between an output link rotatable about an axis of rotation and an input member, such as an end, coaxial to the output link and optionally rotatable about the same axis of rotation. In some embodiments, the end can be fixed. The thermo-active module of the proposed design is contained in the outer housing, containing the following components as depicted in FIGS. 1-3: any amount (e.g., one or more) of radially mounted flexible Peltier units (e.g., one, two, three as shown, or four or more, etc.), a spiked wheel along the central axis, an elastic member such as fixed-stiffness compression springs, and thermoplastic inserts. The flexible thermoelectric Peltiers can be in slots that have access to the outside environment. This mounting provides that when a current flows through the Peltier, the inner sides get cold (to reduce the temperature of polycaprolactone inside the housing), their outer sides get hot, and vice versa. This generated heat is removed from the system, otherwise the performance of the Peltier may be dramatically affected and possibly lead to failure. The spiked wheel is held central via ball bearings, in contact with the polycaprolactone, and connected to the outer housing via compression springs.

Figure 4:
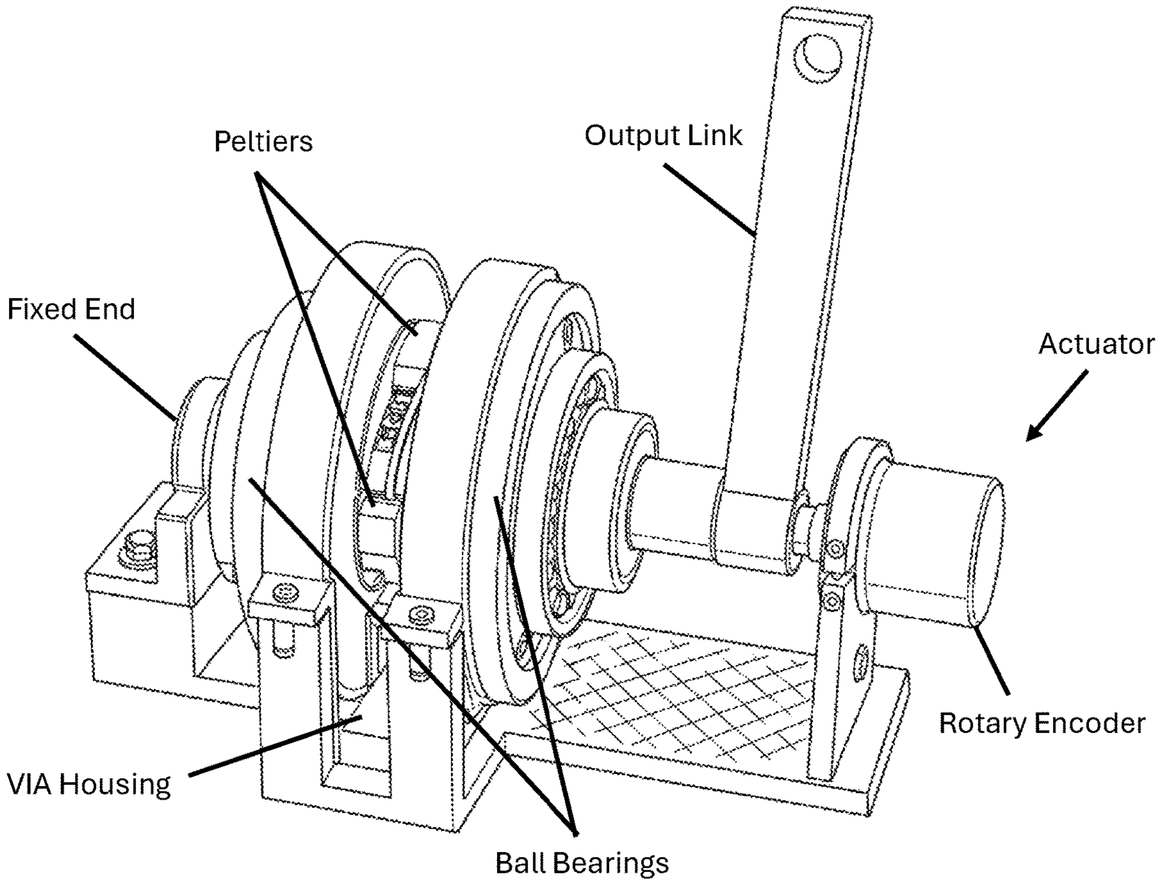
FIG. 4 illustrates another thermo-active VIA constructed with three-dimensional (3D)-printed PETG components with integrated Peltiers according to some embodiments.

A spiked wheel is placed inside the outer ring and attached to the output link while the spikes are in contact with the PCL inside the outer ring. Once the output link moves, the spiked wheel rotates inside the housing and presses on the polycaprolactone. Each spike is also connected to the outer ring via compression springs. As the spiked wheel rotates, the springs become compressed and thus the output link module that has a fixed level of compliance due to embedded compression springs and a tunable damping ratio due to the polycaprolactone polymer. The output of the thermo-active module is connected to the actuator's link. In some embodiments, an outer ring attached to a fixed base which holds the polycaprolactone inside, and three radially-mounted thermoelectric Peltiers, as depicted in FIG. 4.

Figure 5:
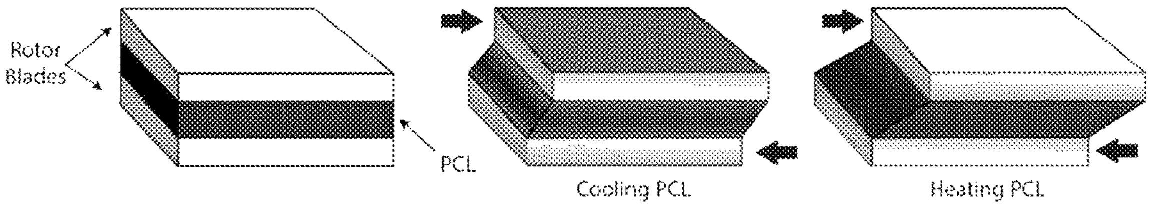
FIG. 5 is a schematic depiction of a shear-mode configuration of a variable impedance module utilizing a thin layer of PCL in contact with a flexible Peltier according to some embodiments.

Referring to FIG. 5, in some embodiments a variable impedance actuator has a 'shear-mode' configuration that enhances the proximity of PCM (phase-change material, e.g., PCL, paraffin, etc.) to the heating source (flexible Peltier). In marked contrast, previous compression-mode configurations can have a loss of contact of the PCL after deflection.

In 1834, French physicist Jean Charles Athanase Peltier discovered that when an electric current is made to flow through a junction between two different conductors, heat may be generated or removed at the junctions depending on the direction of electric current. This is known as the Peltier effect, which is the reverse of the Seebeck effect. With the development of semi-conductors, Peltiers became more efficient, and Peltiers have been used in many applications.

Figure 6A:
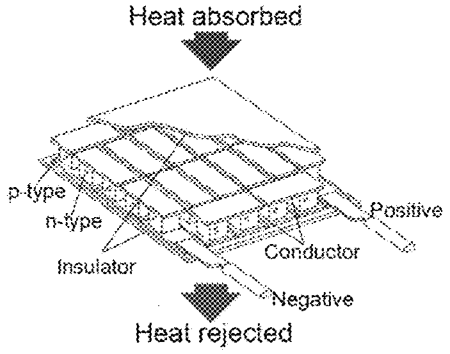
FIGS. 6A-B show A) a cutaway view of a typical Peltier and B) an operation principle of a Peltier with one p-type and one n-type thermoelement.
Figure 6B:
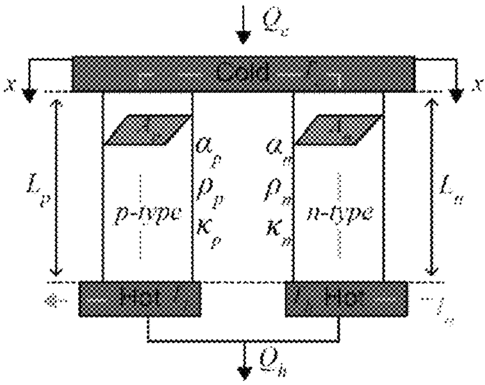
Figure 7A:
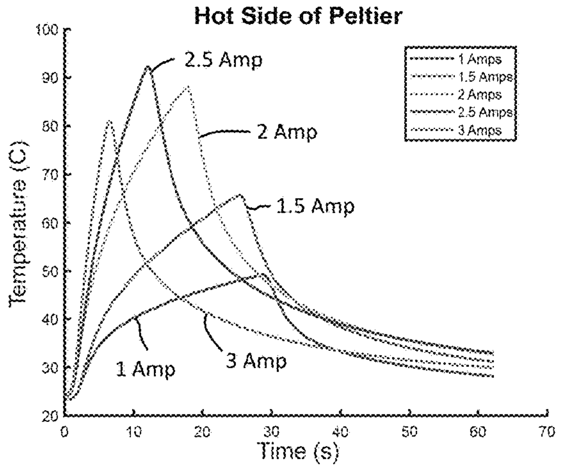
FIGS. 7A-B are graphical depictions of A) a hot side and corresponding B) a cold side of each surface of the Peltier with varying current sources. A current source is removed at the peak of each heating curve.
Figure 7B:
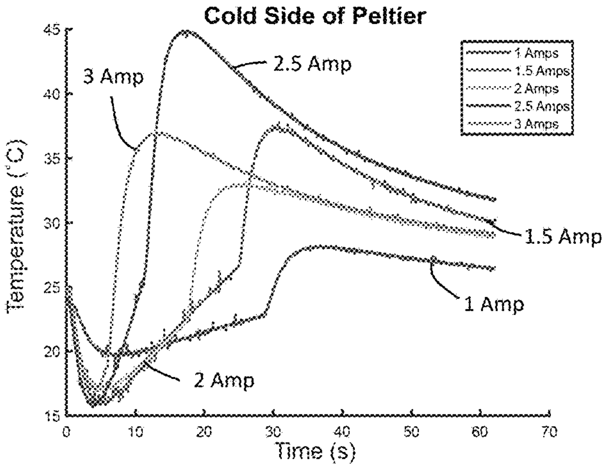

When an electrical current is applied, the current induces a heat flow at the cold and hot junctions, as depicted in FIG. 6A. The heat flow determines the temperature at each side of the Peltier based on the Seebeck effect coefficient, thermal conductivity, specific electrical resistance, cross-sectional area, and length of n- and p-type semiconductors, as depicted in FIG. 6B. Referring to FIGS. 7A-B, the current applied at a hot side and a cold side of a Peltier at various amperages are depicted.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

In order to examine the capability of the VIA in regulating the overall impedance of the output link, a perturbation test is conducted, with the collected data used for system identification. The PCL temperature is set at different levels from room temperature (about 22° C.) to about 60° C. using the Peltiers. The temperature affecting the time-dependent impedance of PCL as the creep behavior, e.g., the recovery of the output link to the equilibrium position, is plotted.

The output link is displaced by 60° C. and is released to return to the equilibrium position. The output link is attached to a rotary encoder, sold under the trade designation E40S6-100-3-T-24 from Autonics Corporation of Busan, Republic of Korea, with 100 pulses per revolution (PPR). The initial resting equilibrium position is calibrated to an encoder count of zero before perturbation. The deflection of the output link is captured with no PCL and PCL with varying temperatures from room temperature (about 22° C.) to about 60° C. to fulfill the full range of viscoelasticity. A reference table is created for the control of the PCL temperature from the Peltier heating at varying currents, so that the Peltier activates, time passes, and then the perturbation data is collected for a desired temperature.

Figure 14:
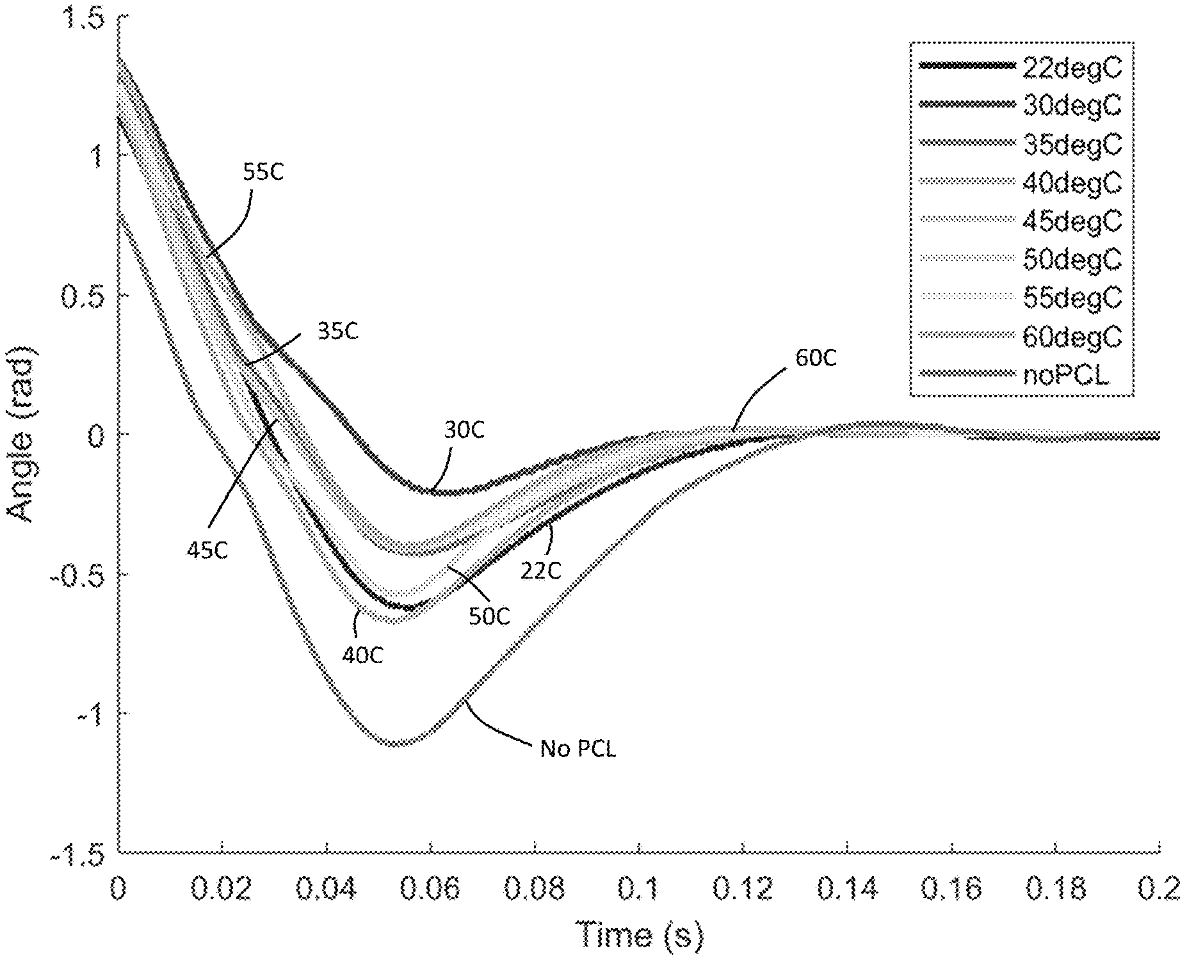
FIG. 14 is a graphical depiction of a perturbation test of the VIA output link, showing deflection with no polycaprolactone (PCL), and PCL incorporated at varying temperatures.

As the temperature increases, the settling time of the output link decreases, and the percent overshoot decreases. Referring to FIG. 14, the output link trajectory response to the perturbations is depicted. During these perturbation tests, the output link has about 10° degrees before the PCL contacts the wheels and the different trials deviate from the equilibrium point of about 0 degrees. Therefore, the trailing values of these tests are used to normalize the curves for overlaying with each other, resulting in starting values indicating about 0.8 to about 1.35 rad.

Equation 1 requires determining $b_{P\ CL}$ and $k_{P\ CL}$, the damping and stiffness coefficients of PCL to fully describe the system. The collected data from the perturbation testing is used for comparison and validation of the model. The output link is adjusted so that the equilibrium point is horizontal, and a known weight is placed on the end to produce a known torque. Using this information, Eq. 3 can provide approximate $k_{P\ CL}$ values for corresponding temperatures.

$$(k_s + k_{PCL}) \cdot \theta = T_t = F \cdot L_t \quad (3)$$

Further, Eq. 1 was adjusted to solve for the last unknown $b_{P\ CL}$.

$$b_{PCL} = \frac{I\ddot{\theta} - (k_s + k_{PCL})\theta}{\dot{\theta}} \quad (4)$$

Once the approximate $k_{P\ CL}$ values are obtained, the only unknown in Eq. 4 is $b_{P\ CL}$, then θ and θ" can be calculated from the perturbation data in FIG. 14 to obtain the values of $b_{P\ CL}$ at the varying temperatures (Table II).

Figures 13A, 13B:
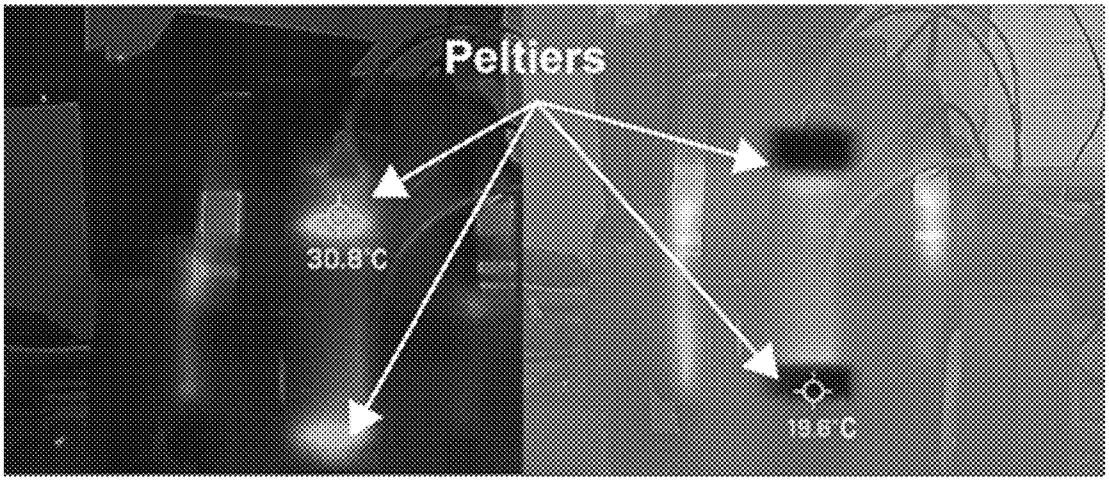
FIGS. 13A-B are pictorial depictions of A) localized heating and B) cooling of the VIA from the Peltiers.

The design of the VIA has the equilibrium position of the compression springs curved around the central axis (radius=22.57 mm), which causes springs to buckle and act nonlinearly as increased forces are applied. Due to this nonlinearly, the $k_s$ values used to calculate $k_{P\ CL}$ (and $b_{P\ CL}$) can differ from values provided by the manufacturer. Furthermore, the geometry of the PCL fit into each cavity surrounding the central wheel shows a non-linear effect for both the $k_{P\ CL}$ and $b_{P\ CL}$ based on the curves obtained during system identification. The $k_{P\ CL}$ follows a clear trend decreasing in magnitude as the temperature increases, and the $b_{P\ CL}$ increases as the temperature increases. However, the $b_{P\ CL}$ values decrease drastically at 55° C. This sudden drop can be due to the non-linear effects observed above. Referring to FIGS. 13A-B, localized heating and cooling from the Peltiers are depicted.

TABLE II

Viscoelastic Properties of Polycaprolactone

| Temperature (° C.) | $k_{P\ CL}$ (Nmm/rad) | $b_{P\ CL}$ newton-millimeter-second/radian (Nmms/rad) |
|---|---|---|
| 22 | 484.28 | 13.588 |
| 30 | 332.95 | 48.341 |
| 35 | 201.87 | 38.572 |
| 40 | 87.369 | 35.251 |
| 45 | 201.87 | 36.684 |
| 50 | 87.369 | 49.950 |
| 55 | 34.882 | 12.796 |
| 60 | 0 | 22.248 |

As discussed above, novel embodiments of regulating the temperature of a viscoelastic polymer, such as polycaprolactone, is used to adjust the impedance of an actuator. Controlling the temperature of polycaprolactone is done using Peltiers, and a simple design is introduced to realize the variable impedance behavior. The simplicity and lightness of the design can open up new possibilities for developing the next generation of thermo-active variable impedance actuators for physical human-robot interaction applications. The embodiments show capabilities of regulating both elasticity and viscosity in an off-line fashion. However, the impedance adjustment rate may still not be suitable for on-line impedance adjustment. Additionally, because some embodiments are 3D printed, some compliance can be attributed to the PETG components. The inconsistency of the VIA can be due to the nonlinear effects of the spring and damping coefficients, coupled with inefficient heat transfer throughout the volume of the PCL, and in some embodiments, control systems can be implemented to hold the temperature consistent in the steady-state, or a look-up table can relate currents of the Peltier to temperature of the PCL volume. In some embodiments, the step signal and sinusoidal response of the VIA can be evaluated with a motor and gearbox driving the rotation. Additionally, the effects of scaling down the size of the actuator on the rate of impedance adjustment can be conducted. In some embodiments, a comprehensive electro-thermo-mechanical model may be used to analyze the performance of the proposed actuator, in order to optimize its applicability. Heatsinks can also be implemented to make the heat transfer of the module more efficient, and benefit the transient response. In some embodiments, the VIA can be implemented to a small form factor robotic joint.

Having described various systems and methods herein, certain embodiments can include, but are not limited to:

In an aspect, an actuator comprises an output link; an input member, wherein the output link and the input member are rotatable about an axis of rotation; an elastic member disposed between the output link and the input member and configured to allow transmission of torque between the output link and the input member about the axis of rotation, and to allow at the same time, as a result of elastic deformation of the elastic member, a relative rotation between the output link and input member about the axis of rotation; and a thermo-active module comprising one or more thermoplastic inserts, wherein the thermoplastic inserts are configured to apply a variable resistance between the output link and the input member and provide an adjustable damping between the output link and the input member.

A second aspect can include the actuator of the first aspect, wherein the one or more thermoplastic inserts comprise polycaprolactone.

A third aspect can include the actuator of the first aspect or the second aspect, further comprising at least one position sensor configured to detect a relative position between the output link and the input member.

A fourth aspect can include the actuator of any one of the proceeding aspects, wherein the thermo-active module comprises one or more radially mounted Peltiers; a spiked wheel disposed about the axis of rotation; the one or more thermoplastic inserts disposed proximate the one or more radially mounted Peltiers; and an outer housing.

A fifth aspect can include the actuator of the fourth aspect, further comprising one or more Peltiers in thermal communication with the one or more thermoplastic inserts, wherein the one or more Peltiers are configured to selectively heat or cool the one or more thermoplastic inserts to change the adjustable damping between the output link and the input member.

A sixth aspect can include the actuator of the fourth aspect or the fifth aspect, wherein the one or more radially mounted Peltiers are flexible Peltiers.

A seventh aspect can include the actuator of any one of the fourth to the sixth aspects, wherein the one or more radially mounted Peltiers are disposed in slots in the outer housing.

An eighth aspect can include the actuator of any one of the fourth to the seventh aspects, wherein the spiked wheel is retained about the axis of rotation in the housing in contact with the one or more thermoplastic inserts, and wherein the spiked wheel is coupled to the outer housing via the elastic member.

A ninth aspect can include the actuator of any one of the proceeding aspects, wherein the elastic member comprises one or more compression springs.

In a tenth aspect, a method of operating a rotary actuator comprises rotating an input member about an axis of rotation; rotating a spiked wheel within a housing, wherein the spiked wheel is coupled to the input member; compressing one or more elastic members, wherein the elastic members are disposed between the spiked wheel and the housing; adjusting a temperature of one or more thermoplastic inserts disposed within the housing; and applying a variable resistance between an output link and the input member using the one or more thermoplastic inserts to provide an adjustable damping between the output link and the input member.

The eleventh aspect can include the method of the tenth aspect, wherein the one or more thermoplastic inserts comprises polycaprolactone.

The twelfth aspect can include the method of the tenth aspect or eleventh aspect, further comprises detecting a relative position between the output link and the input member.

The thirteenth aspect can include the method of any one of the tenth to the twelfth aspects, wherein a thermo-active module comprises one or more radially mounted Peltiers; a spiked wheel disposed about the axis of rotation; the one or more thermoplastic inserts disposed in thermal contact with the one or more radially mounted Peltiers; and an outer housing.

The fourteenth aspect can include the method of the thirteenth aspect, wherein the one or more Peltiers are in thermal communication with the one or more thermoplastic inserts, wherein the method further comprises selectively heating or cooling the one or more thermoplastic inserts to change the adjustable damping between the output link and the input member.

The fifteenth aspect can include the method of the thirteenth aspect or fourteenth aspect, wherein the one or more radially mounted Peltiers are flexible Peltiers.

The sixteenth aspect can include the method of any one of the thirteenth to the fifteenth aspects, wherein the one or more radially mounted Peltiers are disposed in slots in the outer housing.

The seventeenth aspect can include the method of any one of the thirteenth to the sixteenth aspects, wherein the spiked wheel is retained about the axis of rotation in the housing in contact with the one or more thermoplastic inserts, and wherein the spiked wheel is coupled to the outer housing via the elastic member.

The eighteenth aspect can include the method of any one of the tenth to the seventeenth aspects, wherein the elastic member comprises one or more compression springs.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

While embodiments of the invention have been shown and described, modifications thereof can be made by one skilled in the art without departing from the spirit and teachings of the invention. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, 95 percent, 96 percent, 97 percent, 98 percent, 99 percent, or 100 percent. Moreover, any numerical range defined by two R numbers as defined above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

What is claimed is:

1. An actuator comprising:

an output link;

an input end, wherein the output link and the input end are rotatable about an axis of rotation;

elastic disposed between the output link and the input end and configured to allow transmission of torque between the output link and the input end about the axis of rotation, and to allow at the same time, as a result of elastic deformation of the elastic, a relative rotation between the output link and input end about the axis of rotation; and a thermo activator comprising one or more thermoplastic inserts, wherein the one or more thermoplastic inserts are configured to apply a variable resistance between the output link and the input end and provide an adjustable damping between the output link and the input end.

2. The actuator of claim 1, wherein the one or more thermoplastic inserts comprises polycaprolactone.

3. The actuator of claim 1, further comprising:

at least one position sensor configured to detect a relative position between the output link and the input end.

4. The actuator of claim 1, wherein the thermo activator comprises:

one or more radially mounted Peltiers;

a spiked wheel disposed about the axis of rotation;

the one or more thermoplastic inserts disposed proximate the one or more radially mounted Peltiers; and an outer housing.

5. The actuator of claim 4, further comprising:

one or more Peltiers in thermal communication with the one or more thermoplastic inserts.

6. The actuator of claim 5, wherein the one or more Peltiers are configured to selectively heat or cool the one or more thermoplastic inserts to change the adjustable damping between the output link and the input end.

7. The actuator of claim 4, wherein the one or more radially mounted Peltiers are flexible Peltiers.

8. The actuator of claim 4, wherein the one or more radially mounted Peltiers are disposed in slots in the outer housing.

9. The actuator of claim 4, wherein the spiked wheel is retained about the axis of rotation in the outer housing in contact with the one or more thermoplastic inserts, and wherein the spiked wheel is coupled to the outer housing via the elastic.

10. The actuator of claim 1, wherein the elastic comprises one or more compression springs.

11. A method of operating a rotary actuator, the method comprising:

rotating an input end about an axis of rotation;

rotating a spiked wheel within a housing, wherein the spiked wheel is coupled to the input end;

compressing one or more elastics, wherein the elastics are disposed between the spiked wheel and the housing;

adjusting a temperature of one or more thermoplastic inserts disposed within the housing; and applying a variable resistance between an output link and the input end using the one or more thermoplastic inserts to provide an adjustable damping between the output link and the input end.

12. The method of claim 11, wherein the one or more thermoplastic inserts comprises polycaprolactone.

13. The method of claim 11, further comprising:

detecting a relative position between the output link and the input end.

14. The method of claim 11, wherein a thermo activator comprises:

one or more radially mounted Peltiers;

a spiked wheel disposed about the axis of rotation;

the one or more thermoplastic inserts disposed in thermal contact with the one or more radially mounted Peltiers; and an outer housing.

15. The method of claim 14, wherein the one or more radially mounted Peltiers are in thermal communication with the one or more thermoplastic inserts.

16. The method of claim 15, further comprising:

selectively heating or cooling the one or more thermoplastic inserts to change adjustable damping between the output link and the input end.

17. The method of claim 14, wherein the one or more radially mounted Peltiers are flexible Peltiers.

18. The method of claim 14, wherein the one or more radially mounted Peltiers are disposed in slots in the outer housing.

19. The method of claim 14, wherein the spiked wheel is retained about the axis of rotation in the housing in contact with the one or more thermoplastic inserts, and wherein the spiked wheel is coupled to the outer housing via an elastic.

20. The method of claim 19, wherein the elastic comprises one or more compression springs.

* * * * *